Figure 1:
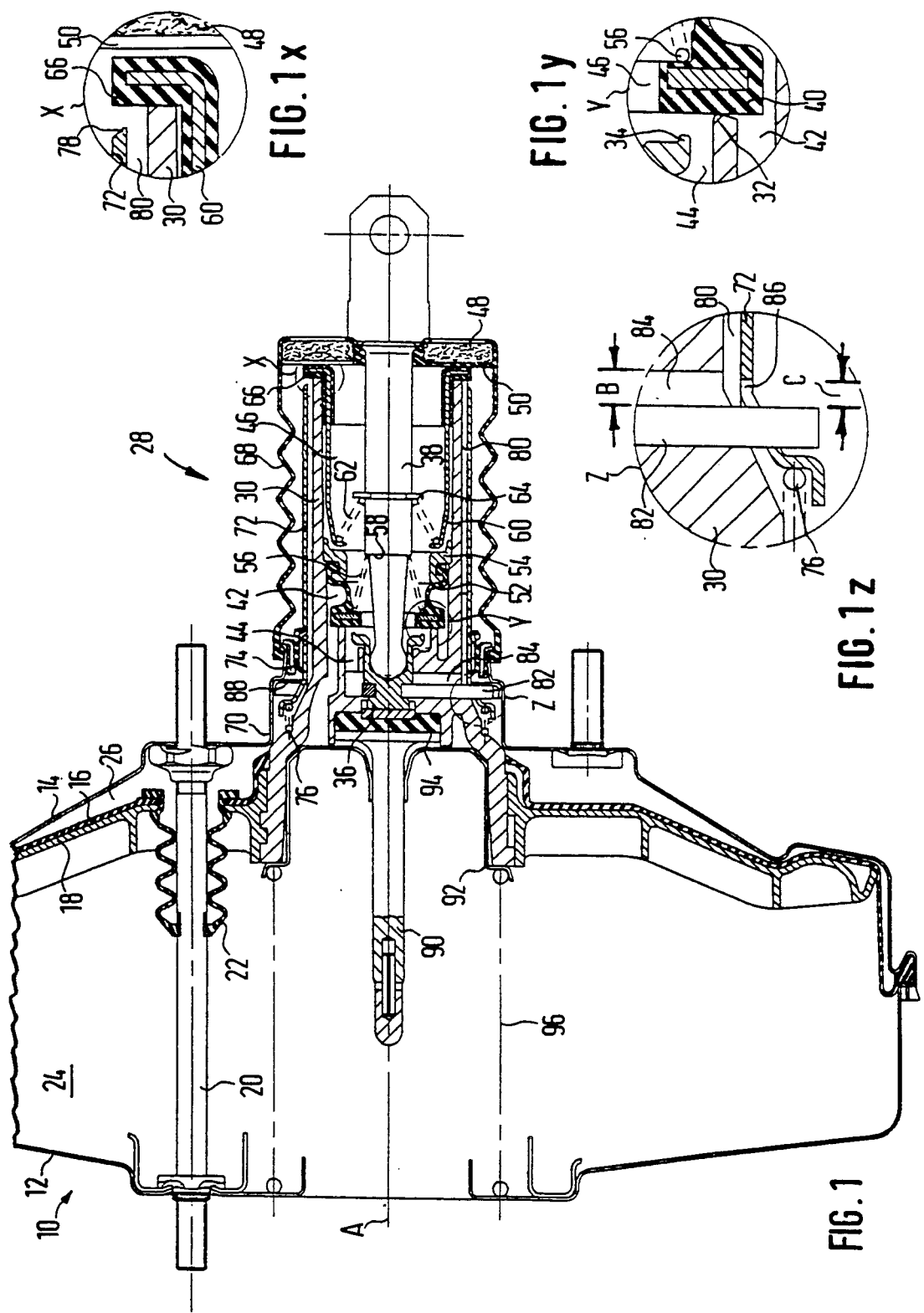

United States Patent [19]

Kaub

[11] Patent Number: 5,056,413
[45] Date of Patent: Oct. 15, 1991

[54] PNEUMATIC BRAKE BOOSTER WITH TWO VALVES FOR ALLOWING ATMOSPHERIC AIR INTO A VARIABLE PRESSURE CHAMBER

[76] Inventor: Manfred Kaub, Im Zillgen 16, 5401 Rhens, Fed. Rep. of Germany

[21] Appl. No.: 543,861

[22] Filed: Jun. 26, 1990

[30] Foreign Application Priority Data

Jun. 30, 1989 [DE] Fed. Rep. of Germany ... 8908040[U]

[51] Int. Cl.[5] .............................................. F15B 9/10
[52] U.S. Cl. ................................................. 91/369.3
[58] Field of Search ................. 91/369.1, 369.2, 369.3, 91/376 K, 377, 378

[56] References Cited

U.S. PATENT DOCUMENTS

| | | | |
|---|---|---|---|
| 3,780,620 | 12/1973 | Gardner | 91/376 R |
| 4,587,884 | 5/1986 | Tsubochi | 91/376 R |
| 4,944,214 | 7/1990 | Briggs | 91/376 R |

*Primary Examiner*—Edward K. Look
*Assistant Examiner*—F. Daniel Lopez

[57] ABSTRACT

In a valve housing (30) a first and a second valve seat (32, 34) are arranged to which a common valve body (40) can be applied. In one position of an actuating member (38) the valve body (40) is lifted only from the first valve seat (32), two chambers (24, 26) of the brake booster (10) thereby being connected together and both separated from an air inlet (50). In another position of the actuating member (38) the valve body (40) is lifted from the second valve seat (34), the two chambers (24, 26) thereby being separated from each other and one of them connected to the air inlet (50). The valve assembly (28) comprises an additional venting channel (80) which opens into the chamber (26) of the brake booster (10) adapted to be connected to the air inlet (50) and is controlled by an additional valve (66, 72). The additional valve (66, 72) is adapted to be opened by a movement of the actuating member (38) which exceeds the movement necessary for lifting the valve body (40) from the second valve seat (34).

5 Claims, 5 Drawing Sheets

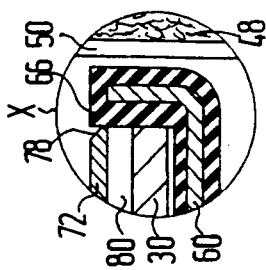
FIG.5x
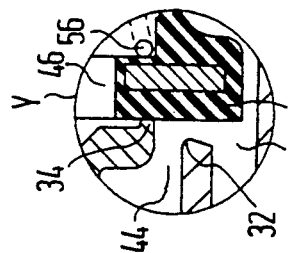
FIG.5y
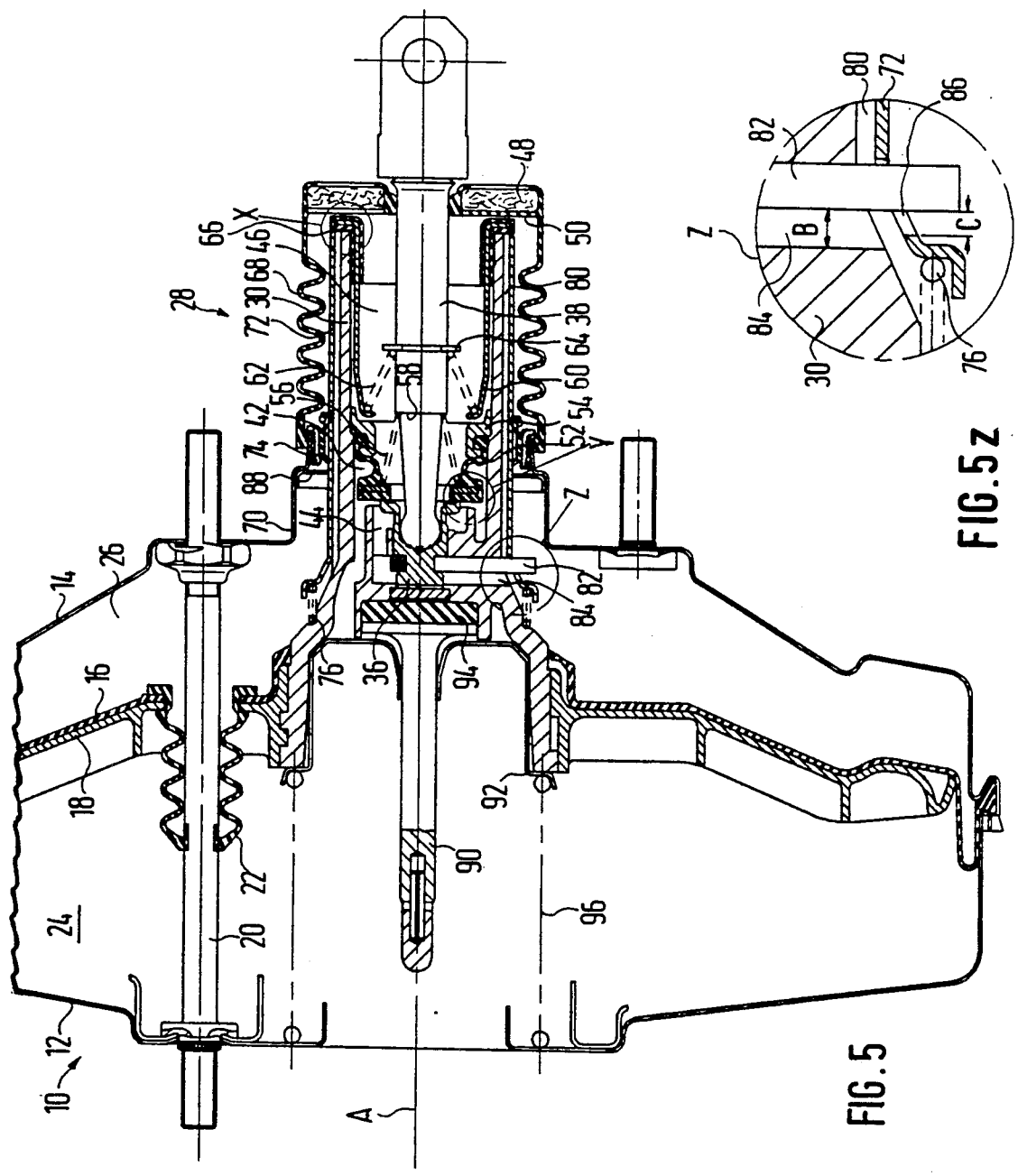
FIG.5
FIG.5z

PNEUMATIC BRAKE BOOSTER WITH TWO VALVES FOR ALLOWING ATMOSPHERIC AIR INTO A VARIABLE PRESSURE CHAMBER

The invention relates to a valve assembly for controlling a pneumatic brake booster comprising a valve housing in which first and second valve seats are arranged and a valve body adapted to be applied to both valve seats, which in one position of an actuating member is lifted from the first valve seat only, thus connecting two chambers of the brake booster to each other and separating both chambers from an air inlet, and in another position of the actuating member is lifted from the second valve seat only, thus separating the two chambers from each other and connecting one of them to the air inlet.

When reference is made here and below to two chambers, they may either be two individual chambers or two groups of chambers connected together, as are present in brake boosters of tandem design.

Valve assemblies of this type are used for example in brake boosters of which the first chamber is continuously connected to a partial vacuum source and the second chamber in a rest position of the valve assembly is connected to the first chamber and consequently likewise evacuated, but in an operating position of the valve assembly is separated from the first chamber and connected to the air inlet. On actuating the valve arrangement ambient air thus flows into the first chamber so that the pressure arising there displaces a wall which separates the two chambers from each other and which in turn moves a force delivering member for actuating a master brake cylinder. An air filter is usually arranged at the air inlet and inevitably has a certain flow resistance and thus necessarily delays the pressure buildup in the first chamber. It is not readily possible to reduce this flow resistance by enlarging the air filter because the overall space necessary for this purpose is usually not available and furthermore the flow cross-sections in the region of the two valve seats are also narrowly limited for space reasons.

For this reason, it was hitherto necessary to accept that known brake boosters reach their full efficacy only gradually so that in an initial phase of an abrupt emergency braking a fraction of greater or lesser magnitude of the force applied by the driver to the brake pedal must be transmitted via mechanical intermediate members to the master brake cylinder.

The invention is based on the problem of designing a valve assembly for controlling a pneumatic brake booster in such a manner that the brake booster assists emergency brakings more rapidly but under normal brakings does not behave substantially differently to the usual manner.

The problem is solved according to the invention in a valve assembly of the type described at the beginning in that the valve assembly comprises an additional venting channel opening into the chamber of the brake booster adapted to be connected to the air inlet, and being controlled by an additional valve which is adapted to be opened by a movement of the actuating member which exceeds the movement required to lift the valve body from the second valve seat.

This achieves that in brakings which are effected by a movement of the actuating member exceeding the usual extent an additional air flow is introduced into the chamber connected to the air inlet so that in a particularly short time the largest possible pressure difference can be built up between the chambers. The additional air flow can come from the ambient air but may also be a pressurized air flow if a suitable source of compressed air is available. The configuration of the valve assembly according to the invention has the additional advantage of avoiding sucking or hissing noises which on violent actuation of known valve assemblies according to the preamble are frequently caused by the high flow velocities of the air flowing in through the channels hitherto present.

The valve assembly according to the invention is preferably further developed in that the additional valve includes a second valve body and an annular third valve seat arranged outside the valve housing, the valve housing is surrounded with radial clearance by a sleeve which carries the third valve seat, is axially movable with respect to the valve housing and is biased in the direction towards the second valve body, the additional venting channel is formed between the valve housing and the sleeve, and the actuating member is connected to the sleeve by a transmission element.

In this manner the valve assembly according to the invention can be made particularly simply and compactly and combined with a brake booster of usual dimensions.

The embodiment of the invention described above is preferably further developed in that the second valve body is arranged at one end of the valve housing adjacent the air inlet and the additional venting channel is fed by a radially outer area of the air inlet.

It is advantageous if the second valve body is formed on a flange-like configuration at a tubular insert which is biased within the valve housing in a direction opposite to the biasing of the sleeve and by a spring bearing against the actuating member. In this manner the second valve body can be assembled without the valve housing having to be modified compared with the known embodiments.

It is further expedient if the transmission element is fixedly connected to the second valve seat and extends with axial play through the respective radial recess of the valve housing and of the sleeve, the axial play of the transmission element with respect to the valve housing being larger than the axial play of the transmission element with respect to the sleeve.

Figure 2:
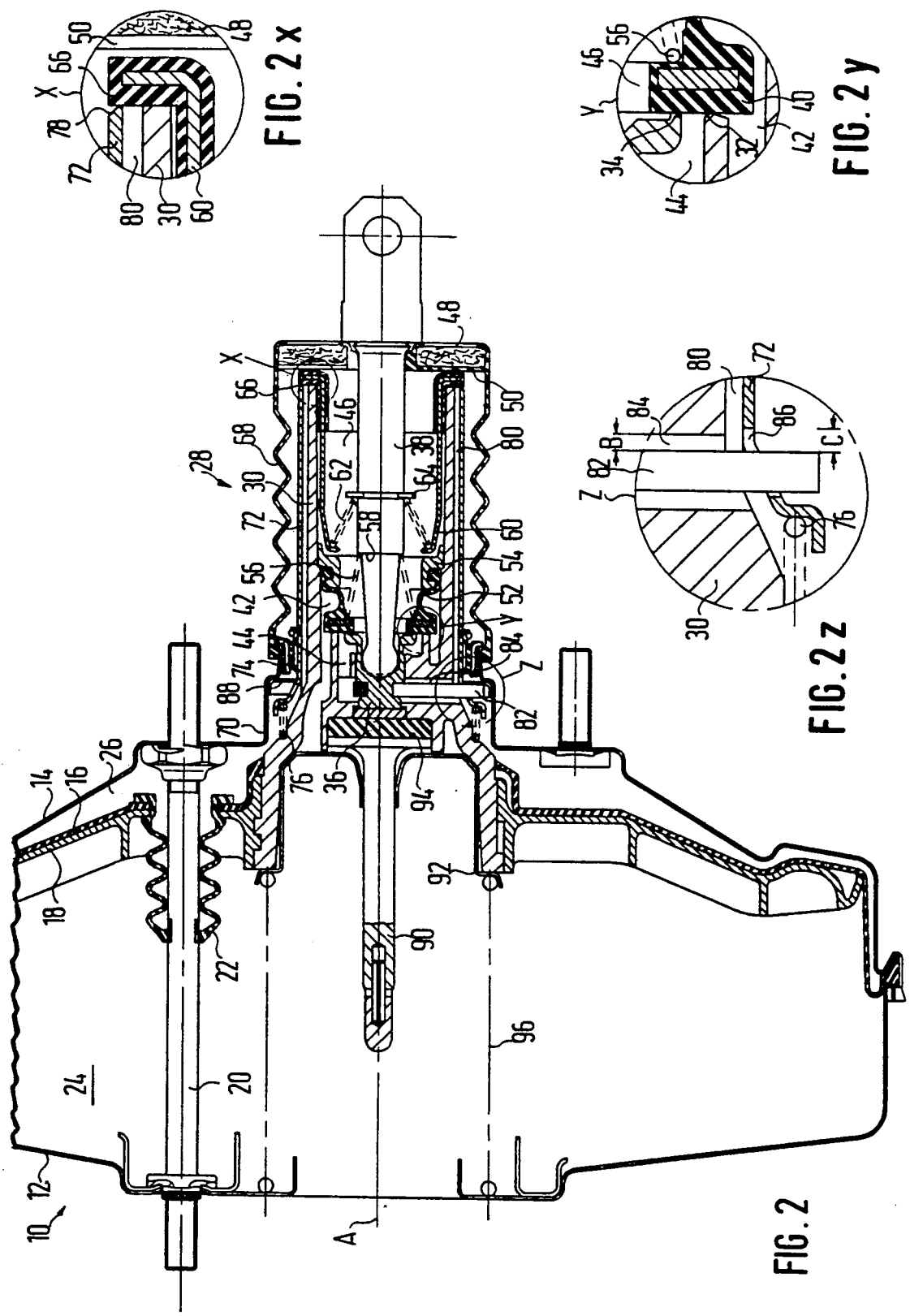
Figure 3:
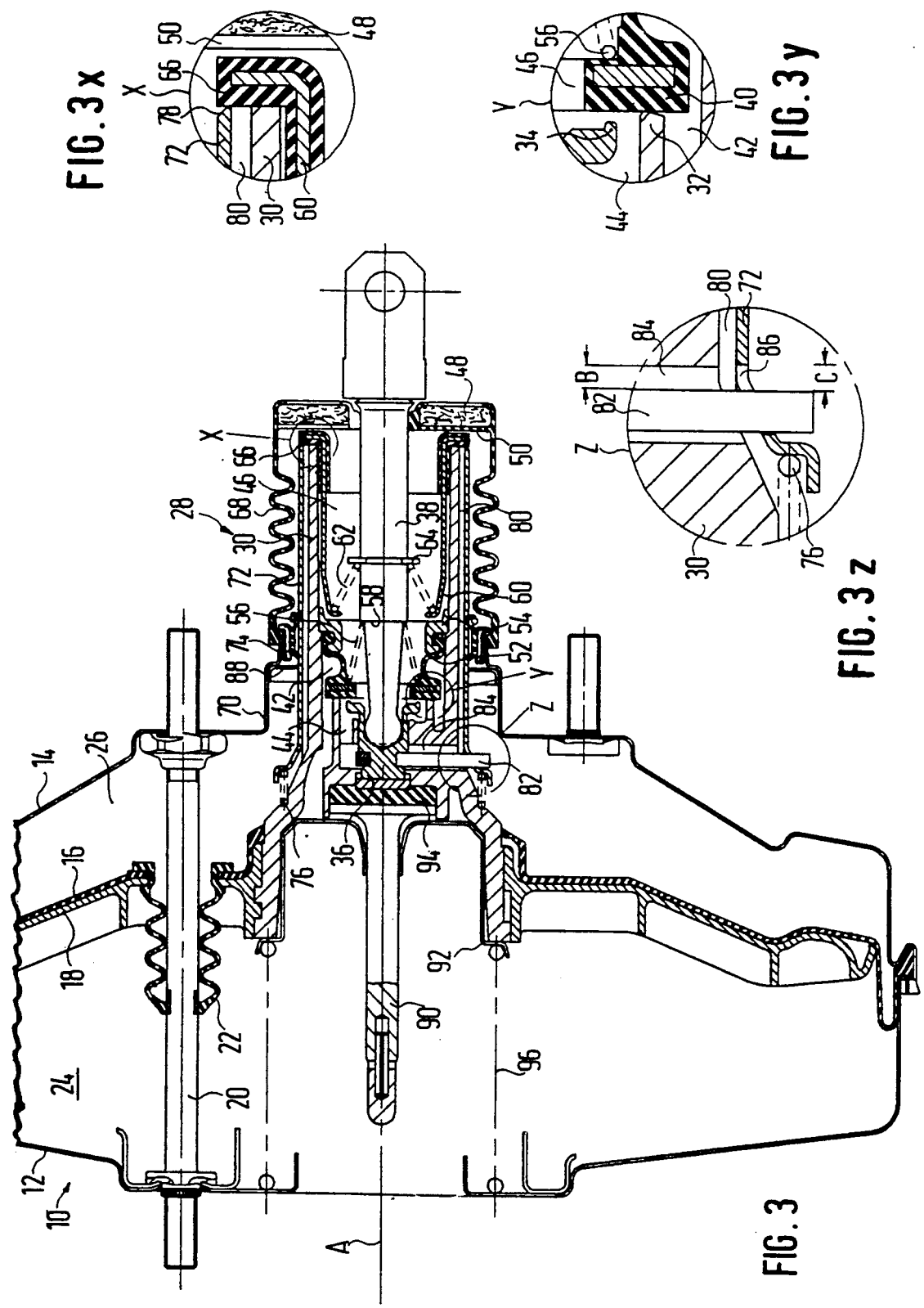
Figures 4, 4X, 4Y, 4Z:
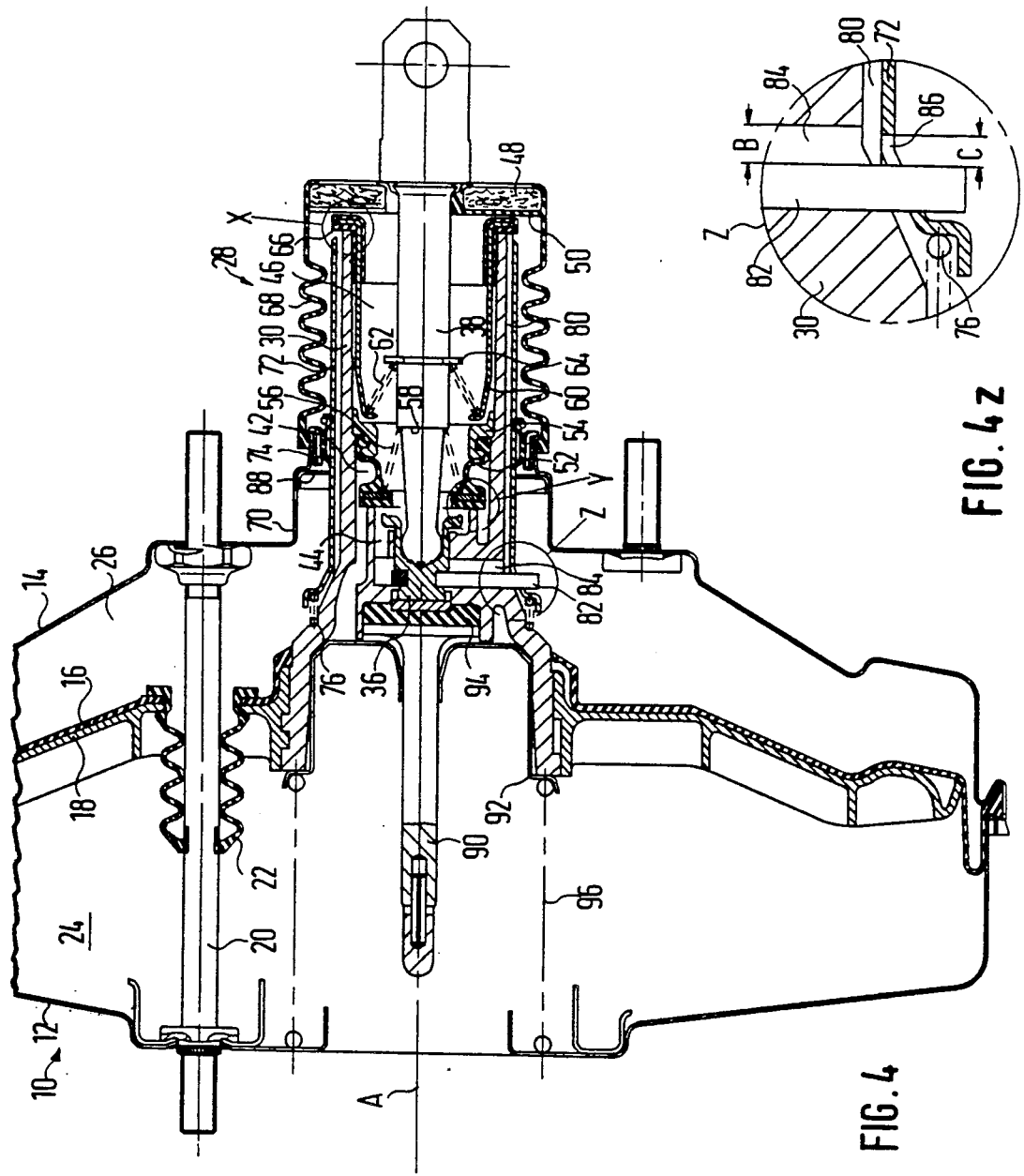

An example of embodiment of the invention will be explained hereinafter in further detail with the aid of schematic drawings. Each of the drawings illustrates a vacuum brake booster of conventional type having a valve assembly according to the invention in the following states:

FIG. 1 unactuated, before applying a vacuum,
FIG. 2 unactuated, with vacuum applied,
FIG. 3 on normal brake actuation,
FIG. 4 on abrupt brake actuation and
FIG. 5 immediately after a brake actuation,
FIGS. 1x, 1y and 1z; 2x and 2z; 3x 3y and 3z; 4x, 4y and 4z, and 5x, 5y and 5z are enlarged drainage position views of the same parts shown in the circled portions x, y and z of FIGS. 1 through 5, respectively.

The brake booster 10 illustrated has two housing parts 12 and 14 which are substantially rotational symmetrical with respect to an axis A and hold clamped between them at their outer edge a diaphragm 16. The diaphragm 16 forms together with a rigid support plate 18 a movable wall; through the latter parallel to the axis A connecting rods 20 extend which connect the housing parts 12 and 14 together and are each sealed by a bellows 22 with respect to the movable wall 16, 18. The movable wall 16, 18 separates two chambers 24 and 26 from each other, the chamber 24 at the front in the usual installation position being permanently connected in use to a vacuum source, for example to the induction pipe of an Otto engine, and the rear chamber 26 being selectively connectable by a valve assembly 28 to the front chamber 24 or to the ambient air.

The valve assembly 28 includes a tubular valve housing 30 which is made substantially rotatation symmetrical with respect to the axis A and is fixedly and sealingly connected to the movable wall 16, 18. An annular first valve seat 32 is formed in the valve housing 30.

A second likewise annular valve seat 34 of smaller diameter is formed coaxially with the first valve seat 32 on a pushmember 36 which is movable by means of an actuating member 38 along the axis A. The actuating member 38 can be connected in usual manner to the brake pedal of a motor vehicle.

Associated with the two valve seats 32 and 34 is a common valve body 40 which together with the first valve seat 32 can separate a radially outer space 42 within the valve housing 30 from an annular intermediate space 44 between the two valve seats and which together with the second valve seat 34 can separate an inner space 46 from the intermediate space 44. The radially outer space 42 is connected to the front chamber 24 and the annular intermediate space 44 to the rear chamber 26. Via a filter 48 in an annular air inlet 50 the inner space 46 is in permanent communication with the surroundings.

The valve body 40 is connected by a sleeve 52 of rubber or an elastomer to a support ring 54 which is sealingly and fixedly installed into the valve housing 30. The valve body 40 is biased in the direction towards the two valve seats 32 and 34 by a first conical spring 56 which bears on a shoulder 58 of the actuating member 38.

A tubular insert 60 is pushed into the valve housing 30 from its end on the right in the drawings and at the rear in the normal installation position and the rear end of said insert is bent outwardly in flange-like manner and held in engagement with the end of the valve housing 30 in that a second conical spring 62 is clamped between a collar at the inner end of the insert 60 and a securing ring 64 mounted on the actuating member 38. A second valve body 66 is formed on the radially outwardly projecting flange of the insert 60.

A bellows 68 extends from the radially outer edge of the air inlet 50 up to a collar 70 formed on the housing part 14. In this manner an annular space round the valve housing 30 is protected from penetration of dirt and unfiltered air. Arranged within said annular space is a sleeve 72 which is sealed by a ring seal 74 against the collar 70 without thereby restricting movement along the axis A. The sleeve 72 is rearwardly biased in the direction towards the second valve body 66 by a spring 76 bearing on the housing part 14 and forms with its rear end 78 a third valve seat normally sealing with respect to the second valve body 66. Between the valve housing 30 and the sleeve 72 a substantially cylindrical annular space is left free and forms an additional venting channel 80 opening into the rear chamber 26.

The pushmember 36 comprises an annular groove into which a substantially hairpin-shaped transmission element 82 is fixedly engaged without play. The transmission element 82 extends from the push member 36 radially through a cutout 84 in the valve housing 30 and a cutout 86 in the sleeve 82 almost up to the inner wall of the collar 70; provided there is an annular stop 88 which limits the movement of the transmission element 82 and thus of the pushmember 36 rearwardly. The transmission element 82 has in the cutout 84 and 86 an axial play B and C respectively, B being greater than C.

In the front end region of the valve housing 30 a force delivery member 90 is secured by means of a holder 92. Between the pushmember 36 and the force delivery member 90 an elastomeric body 94 is arranged which is otherwise surrounded by the valve housing 30 and forms a force transmitter between the actuating member 38 and the force delivery member 90. The entire assembly, including the movable wall 16, 18 and the valve housing 30, is rearwardly biased by a return spring 96.

As long as the vacuum provided is not effective in the front chamber 24 of the brake booster 10, for example before starting the engine of the associated motor vehicle, the movable parts of the brake booster 10 and the valve assembly 28 assume the position shown in FIG. 1. The valve body 40 bears on the first valve seat 32 but not on the second valve seat 34; the additional valve formed by the sleeve 72 and the second valve body 66 is open. The rear chamber 26 is thus connected both via the inner space 46 of the valve housing 30 and via the additional venting channel 80 to the environment. The connection between the two chambers 24 and 26 is interrupted.

If now, for example by starting said Otto engine, a partial vacuum is generated in the front chamber 24 the movable wall 16, 18 is moved forwardly together with the valve housing 30 against the initially small resistance of the return spring 96 through a small distance whilst the actuating member 38 together with the push member 36 retains its rest position. The valve body 40, which in accordance with FIG. 1 so far bore only on the first valve seat 32, consequently bears lightly on the second valve seat 34 and the second valve body 66 bears on the end 78 of the sleeve 72 defining the third valve seat, which likewise retains its rest position. An equilibrium state according to FIG. 2 arises in which the front chamber 24 is evacuated to the extent governed by the vacuum source and in the rear chamber 26 a pressure obtains which is somewhat greater than the pressure in the front chamber 24 but considerably less than atmospheric pressure. The brake booster 10 is now ready to actuate without any further delay a master brake cylinder, which is not illusrated and on which the force delivery member 90 acts in usual manner.

As soon as the brake pedal is actuated in normal manner and the actuating member 38 thereby pushed forwardly a small distance, the second valve seat 34 separates itself from the valve body 40 in accordance with FIG. 3. Said body 40 now bears with the full force of the first conical spring 56 solely on the first valve seat 32 and thereby separates the two chambers 24 and 26 from each other completely in sealing manner while ambient air which is sucked in through the filter 48 passes via the inner space 46 and the annular intermediate space 44 into the rear chamber 26 and pushes the movable wall 16, 18 together with the valve housing 30 and force delivery member 90 forwardly and thereby actuates the connected master brake cylinder. While this happens the sealing engagement of the second valve body 66 with the third valve seat 78 on the rear end of the sleeve 72 is retained so that the additional venting channel 80 has no effect.

If however the brake pedal is more violently actuated and thus pushed further forwardly via the actuating member 38 of the push member 36, the transmission element 82 strikes the front edge of the cutout 86 in the sleeve 72 and entrains the latter forwardly so that the third valve seat 78 of the sleeve 72 is lifted from the third valve seat 76 in accordance with FIG. 4. As a result, ambient air now flows not only from the radially inner region of the filter 48 through the inner space 46 and further through the annular intermediate space 44 into the rear chamber 26, but furthermore additional ambient air flows through the radially outer region of the filter 48 and further through the additional venting channel 80 likewise into the rear chamber 26 so that the pressure obtaining there very rapidly becomes equal to the ambient pressure and the movable wall 16, 18 along with the force delivery member 90 is pushed forwardly correspondingly rapidly.

If after a brake actuation the brake pedal is released the conditions illustrated in FIG. 5 temporarily arise; the valve body 40 is lifted off the first valve seat 32 and bears sealingly on the second valve seat 34 while the third valve seat 78 of the sleeve 72 bears sealingly on the second valve body 66. The rear chamber 26 is consequently separated from the environment and connected to the front chamber 24 so that pressure equalization takes place and the movable components return to the equilibrium position according to FIG. 2.

I claim:

1. In a pneumatic brake booster having first and second chambers separated by a pressure responsive movable wall, said first chamber being adapted to be connected at all times during use to a source of vacuum and said second chamber being adapted to be selectively connected through first and second valves to said first chamber or to an atmospheric inlet, said booster including a manually operable actuating member and a valve assembly responsive to movement of said actuating member, said assembly comprising a valve housing, a valve body and first and second valve seats arranged in said housing which, with said valve body, define said first and second valves, said first valve seat in one position of said actuating member being lifted clear of said valve body to connect said two booster chambers to each other and separate both chambers from said atmospheric air inlet, said second valve seat when it only is lifted clear of said valve body in another position of said actuating member separating said two chambers from each other while connecting said second chamber to said atmospheric air inlet, the invention comprising an additional venting channel opening directly into said second chamber and adapted to be connected to said atmospheric air inlet, a normally closed third valve for controlling the connection of said venting channel with said atmospheric air inlet, and means responsive to movement of said actuating member in excess of that required to lift said second valve seat from said valve body and connect said second chamber to said air inlet to open also said third valve and connect said second chamber directly to said atmospheric air inlet through said venting channel whereby atmospheric air flows to said second chamber both through said second valve and through said venting channel.

2. In the booster of claim 1, an annular second valve body extending radially beyond said valve housing, a sleeve surrounding said valve housing with radial clearance and having an annular third valve seat at one end for cooperation with said second valve body, said sleeve extending sealingly at its other end into said second chamber, said sleeve being axially movable with respect to said second valve body, means biassing said sleeve so that said third valve seat is normally in sealing engagement with said second valve body, said additional venting channel being formed between said valve housing and said sleeve, and a transmission element connecting said sleeve to said actuating member for moving said third valve seat away from said second valve body and connect said vent channel to said atmospheric air inlet in response to said excess movement of said actuating member.

3. In the booster of claim 2 wherein said second valve body is disposed at an end of said valve housing remote from said second booster chamber and adjacent said atmospheric air inlet, said inlet having a radially outer area arranged to feed atmospheric air to said venting channel upon separation of said third valve seat from said second valve body in response to said excess movement of said actuating member.

4. In the booster of claim 3 including a tubular insert slideably received within said valve housing, said insert having a radial flange extending outwardly beyond said remote end of said valve housing, said second valve body being formed on said flange, resilient means within said housing and bearing on said actuating member to bias said tubular insert in a direction opposite to the direction in which said sleeve is biased by the first mentioned resilient means towards said second valve body.

5. Valve assembly as claimed in any one of claims 2 to 4, wherein said transmission element is fixedly connected to said second valve seat and extends with axial play through respective radial recesses in said valve housing and in said sleeve, the axial play of said transmission element with respect to said valve housing being larger than the axial play of said transmission element with respect to said sleeve.

* * * * *

UNITED STATES PATENT AND TRADEMARK OFFICE
CERTIFICATE OF CORRECTION

PATENT NO.   :   5,056,413
DATED        :   October 15, 1991
INVENTOR(S)  :   Manfred Kaub It is certified that error appears in the above-identified patent and that said Letters Patent is hereby corrected as shown below:

Col. 2, line 61, after "2x" insert --, 2y--;

Col. 2, line 62, change "drainage" to --change--;

Signed and Sealed this

Second Day of March, 1993

*Attest:*

STEPHEN G. KUNIN

*Attesting Officer*     *Acting Commissioner of Patents and Trademarks*